United States Patent
Hoffjann et al.

(10) Patent No.: US 7,980,513 B2
(45) Date of Patent: Jul. 19, 2011

(54) WATER-WASTEWATER MODULE FOR AIRCRAFT

(75) Inventors: Claus Hoffjann, Hamburg (DE); Wolfgang Zierold, Hamburg (DE); Andreas Westenberger, Hamburg (DE)

(73) Assignee: Airbus Deutschland GmbH (DE)

( * ) Notice: Subject to any disclaimer, the term of this patent is extended or adjusted under 35 U.S.C. 154(b) by 691 days.

(21) Appl. No.: 11/524,983

(22) Filed: Sep. 21, 2006

(65) Prior Publication Data

US 2007/0069078 A1    Mar. 29, 2007

Related U.S. Application Data

(60) Provisional application No. 60/718,992, filed on Sep. 21, 2005.

(30) Foreign Application Priority Data

Sep. 21, 2005  (DE) .................. 10 2005 045 130

(51) Int. Cl.
    *B64D 1/00* (2006.01)
(52) U.S. Cl. ............ 244/136; 244/137.1; 4/431; 4/321
(58) Field of Classification Search .................. 244/136, 244/137.1, 118.5; 4/431, 321
    See application file for complete search history.

(56) References Cited

U.S. PATENT DOCUMENTS

| | | | |
|---|---|---|---|
| 2,623,721 A | 12/1952 | Harrington | |
| 3,655,448 A * | 4/1972 | Setzer | 429/20 |
| 4,063,315 A * | 12/1977 | Carolan et al. | 4/316 |
| 4,275,470 A * | 6/1981 | Badger et al. | 4/316 |
| 4,306,693 A | 12/1981 | Cooper | |
| 4,376,315 A * | 3/1983 | Badger et al. | 4/431 |
| 4,521,925 A * | 6/1985 | Chen et al. | 4/362 |
| 4,819,279 A * | 4/1989 | Sigler et al. | 4/300 |
| 4,955,091 A * | 9/1990 | Grills et al. | 4/321 |
| 5,133,853 A * | 7/1992 | Mattsson et al. | 210/104 |
| 6,101,641 A * | 8/2000 | Hawkins et al. | 4/484 |
| 6,428,680 B1 * | 8/2002 | Kreichauf | 205/628 |
| 6,500,319 B2 * | 12/2002 | LaConti et al. | 204/263 |
| 2004/0043276 A1 | 3/2004 | Hoffjann et al. | |
| 2004/0245385 A1 | 12/2004 | McElroy et al. | |
| 2005/0266287 A1 | 12/2005 | Hoffjann et al. | |

FOREIGN PATENT DOCUMENTS

| | | |
|---|---|---|
| DE | 102 16 361 | 4/2003 |
| DE | 102 49 588 | 5/2004 |
| DE | 103 39 507 | 3/2005 |
| EP | 0 446 504 | 9/1991 |

OTHER PUBLICATIONS

Office Action from corresponding German Application 10 2005 045 130.6, dated Mar. 27, 2009.

* cited by examiner

*Primary Examiner* — Tien Dinh
*Assistant Examiner* — Philip J Bonzell
(74) *Attorney, Agent, or Firm* — Lerner, David, Littenberg, Krumholz & Mentlik, LLP

(57) ABSTRACT

Currently, the wastewater collection tank and the freshwater tanks comprise separate containers which are each mounted individually in the pressurized area of the cabin on the structure. In the present application a water-wastewater module is described which has two tanks for disposing of feces and wastewater and a water generation unit in the form of the fuel-cell module as integral components. The module and the fuselage may advantageously be manufactured separately from one another and first have to be combined during the final mounting of the aircraft.

17 Claims, 3 Drawing Sheets

WATER-WASTEWATER MODULE FOR AIRCRAFT

CROSS-REFERENCE TO RELATED APPLICATIONS

This application claims the benefit of the filing date of U.S. Provisional Patent Application No. 60/718,992 filed Sep. 21, 2005, the disclosure of which is hereby incorporated herein by reference.

BACKGROUND OF THE INVENTION

The present invention relates to the supply and disposal of an aircraft. In particular, the present invention relates to a water-wastewater module for disposing feces and wastewater, for providing fresh water, and for providing a vacuum for transporting feces in an aircraft, the use of a corresponding water-wastewater module in an aircraft, as well as to an aircraft comprising a corresponding water-wastewater module.

In current vacuum wastewater systems and freshwater storage tanks in passenger aircraft, the feces are transported from the toilet bowl via pipelines using an air flow which results in the aircraft from the differential pressure between external air and cabin air. These feces are then collected in the vacuum tanks (wastewater collection tanks) at least in the rear of the aircraft and disposed after landing on the ground via the "drain valve".

Since at low flight levels or during shutdown times on the ground, the differential pressure between external air and cabin air is too low for a delivery flow or is not provided at all, to build up this differential pressure, the wastewater collection tank is evacuated using a vacuum generator, the "blower". The differential pressures thus achievable are between approximately 270 mbar (vacuum generator) and 570 mbar (travel flight level).

Currently, wastewater collection tanks comprise one or more separate containers which are mounted in the pressurized area of the cabin on the structure. These tanks have the connections for the vacuum pipelines from the toilets, the connections for the vacuum generator, and the outside air line having a filter device for separating air and liquid on their top. One outlet connecting piece per tank is typically located on the bottom for draining the tanks. These drainage connecting pieces of all tanks provided are shut off via valves and then combined to form a drainage connecting piece, which is additionally secured using a valve on the bottom of the fuselage.

In addition, add-on parts for fill level measurement and for preventing freezing of the water components (e.g., in feces) located in the tanks are provided, as well as devices for flushing or cleaning the tanks.

Fresh water is carried in aircraft in one or more freshwater tanks and distributed in the aircraft via a line network to the corresponding taps, as are located in galleys or wash rooms, for example, with the aid of a pump or by applying pressure to the freshwater tank using compressed air.

The fresh water required for this purpose is brought into the tanks via a tank truck or a ground connection via a filling device on the outer skin of the aircraft, the "service panel". In this case, the water quality is dependent in each case on the supply quality of the particular location of the aircraft and the quantity is limited by the tank size.

SUMMARY OF THE INVENTION

There may be a need for an improved water supply and wastewater disposal for aircrafts.

According to an exemplary embodiment of the present invention, a water-wastewater module for disposing of feces and wastewater, for providing fresh water, and for providing a vacuum for transporting feces in an aircraft is provided, the module comprising a first tank and a second tank, the first tank being a vacuum-proof pressure container for transporting feces or wastewater, the second tank being an unpressurized storage container, and the second tank being situated below the first tank and being connected to the first tank to drain content from the first tank into the second tank.

By providing a module for the feces and wastewater disposal and the fresh water provision installation times during equipment mounting may be shortened, space may be saved for systems in the cabin area, particularly in the cargo space, and better accessibility may be achieved in case of maintenance in comparison to typical systems comprising aircraft fuselage, wastewater collection tank, and water disposal. For this purpose, the supply and disposal unit is assembled as an integrated component, which may be inserted into the fuselage in the form of a self-supporting module from below or laterally or from any arbitrary other direction, for example. This module may be inserted into the pressurized area of the fuselage depending on the installation location, for example, and then seal it after being mounted. The module itself may be adapted as seal for sealing an aircraft interior to the outside. If installed in the unpressurized area, the module may assume the insulation and heating functions for the water and wastewater components.

According to a further exemplary embodiment of the present invention, the water-wastewater module also comprises a pipeline or conduit for connecting the first tank to the second tank and an interposed valve for opening the connection, the module being situated in an unpressurized area of the aircraft.

By situating the module in an unpressurized area of the aircraft, the existing partial vacuum may be used for the purpose of suctioning the feces or the wastewater out of the pressurized area of the aircraft into the first tank.

According to a further exemplary embodiment of the present invention, the water-wastewater module also comprises a pressure cylinder, which is impinged with or exposed to cabin pressure to open the valve on a first side of the pressure cylinder and is impinged or exposed to on a second side of the pressure cylinder with ambient pressure, the impingement or exposure of the first and second sides of the pressure cylinder being implemented so that the pressure cylinder opens the valve when the ambient pressure falls below the cabin pressure.

The valve is thus activated via a pressure cylinder, which uses the differential pressure between cabin and outside as positioning energy. For example, the storage container (second tank) also works as a vacuum container at travel flight level in this system. It is thus possible to implement a shape-tailored container having relatively low wall thicknesses, since no pressure differences occur between the outside and the inside of the container.

According to a further exemplary embodiment of the present invention, the water-wastewater module also comprises a pipeline or conduit for connecting the first tank to the second tank and an interposed pump for pumping the contents of the first tank into the second tank, the module being situated in a pressurized area of the aircraft.

According to a further exemplary embodiment of the present invention, the water-wastewater module has an integrated freshwater buffer tank for providing fresh water.

It may thus be possible to buffer sufficient fresh water temporarily inside the module to always ensure a sufficient supply for the passengers.

According to a further exemplary embodiment of the present invention, the water-wastewater module also comprises a fuel-cell module having at least one fuel cell for producing water, oxygen, and electrical energy, the fuel-cell module being connected to the integrated freshwater buffer tank to supply the water produced to the integrated freshwater buffer tank.

Fresh water may thus be produced directly on board the aircraft inside the water-wastewater module. The amount of water to be carried on board may thus be reduced. With appropriate dimensioning of the fuel-cell module, all water consumed in the air may be produced directly on board, so that no fresh water has to be pumped on on the ground.

According to a further exemplary embodiment of the present invention, the fuel-cell module is connected to a passenger area in order to supply the oxygen produced to the passengers.

In other words, the complete water supply, wastewater or feces disposal, the oxygen supply, and the hydrogen disposal is provided by the module.

According to a further exemplary embodiment of the present invention, the fuel-cell module has a thermal connection for heating a water-guiding component of the water-wastewater module using waste heat of the fuel-cell module.

In this way, the tanks in proximity to the structure, which are located in proximity to the module, may be heated by the module.

According to a further exemplary embodiment of the present invention, the water-wastewater module has a thermal management system, which relays and controls waste heat of the fuel-cell module to heat a water-guiding component of the water-wastewater module.

In this way, it may be possible to regulate or control the heat economy of the fuel-cell module and the water-guiding components of the water-wastewater module so that, for example, sufficient hot water is always provided and/or icing of the water-guiding components is prevented.

According to a further exemplary embodiment of the present invention, the module comprises a hydrogen accumulator for storing hydrogen, the hydrogen accumulator being an integral component of the module.

An external hydrogen supply is thus not necessary and may be omitted.

According to a further exemplary embodiment of the present invention, the hydrogen accumulator is implemented in the form of a pressurized tank, a metal hydride accumulator, or a cooling tank for storing liquid hydrogen. Furthermore, in addition to the storage of the hydrogen in liquid, gas, or hydride accumulators, storage in partially solidified form or storage in carbon nanotubes or nanocubes are also possible.

Furthermore, according to a further aspect of the present invention, the water-wastewater module may be implemented for installation in a fuselage opening of the aircraft. For this purpose, the module comprises a shell section, which forms an outer face of the module and which may be a section of a wall of the second tank, for example. So that the module according to the present invention does not already have to be installed in the interior of the aircraft fuselage during the structural and equipment mounting, the shell section has a contour which corresponds to the contour of the fuselage opening of the aircraft fuselage, for example, so that the module may be fitted in the aircraft fuselage using its shell section at arbitrary times. In this case, the first tank and the second tank come to rest in the interior of the aircraft and the fuselage opening is completely closed by the shell section, so that no discontinuity in the aircraft fuselage may be perceived from the exterior.

It may thus be possible to manufacture the module separately from the aircraft fuselage, so that the structural and equipment mounting of the aircraft fuselage may thus be accelerated, since the integration of the module according to the present invention must first be scheduled during the final mounting of the aircraft fuselage, for example.

According to a further exemplary embodiment of the present invention, the module has a contour corresponding to a fuselage opening, into which the module may be fitted so that the module seals the interior of the aircraft fuselage to the outside.

As may be seen clearly from the preceding embodiments, using the module according to the present invention, the shutdown and maintenance times of the aircraft may be significantly reduced, so that the present invention has a direct influence on the aircraft per se. According to a further aspect, the present invention thus relates to an aircraft which has at least one water-wastewater module for disposing of feces and wastewater, for providing fresh water, and for providing a vacuum to transport feces corresponding to the water-wastewater module described above.

Further exemplary embodiments of the present invention result from the subclaims and the use claim.

BRIEF DESCRIPTION OF THE DRAWINGS

In the following, the present invention is described in greater detail on the basis of exemplary embodiments with reference to the drawings.

DETAILED DESCRIPTION

Figure 1:
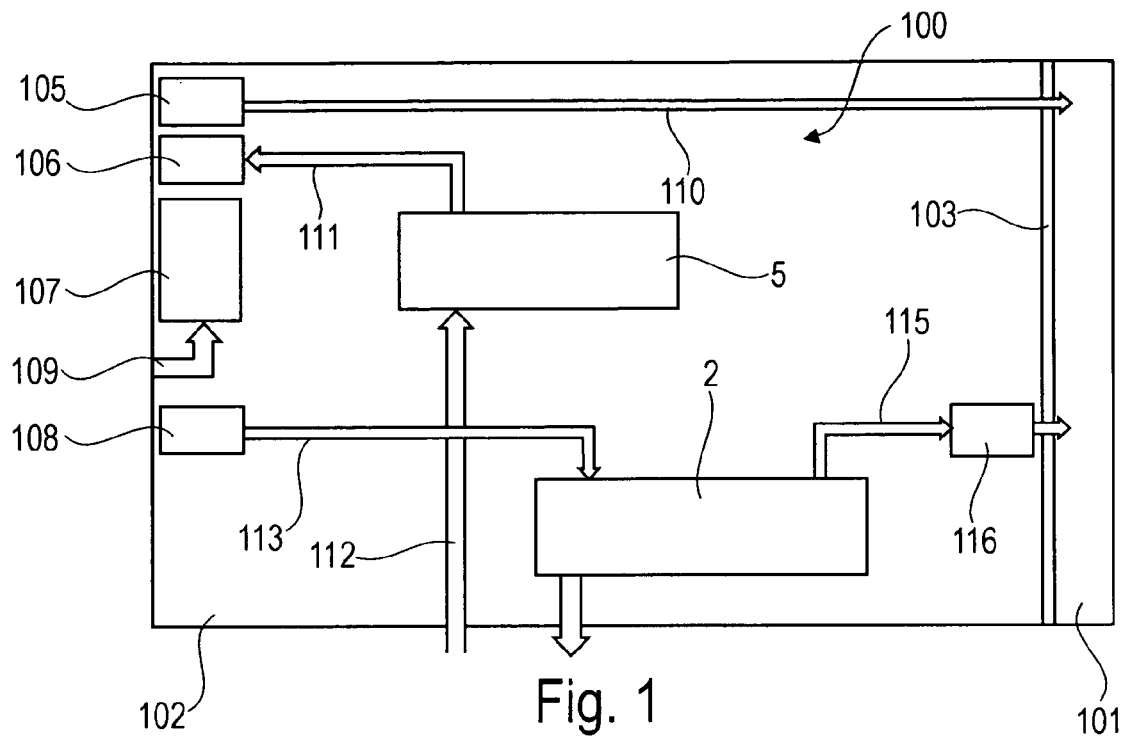
FIG. 1 shows a schematic representation of a water-wastewater module in the pressurized area of the fuselage according to an exemplary embodiment of the present invention.

Identical reference numerals are used for identical or similar elements in the following description of the figures.

The illustrations in the figures are schematic and are not to scale.

FIG. 1 shows a schematic representation of a water-wastewater module in the pressurized area of the fuselage equipped with standard water and wastewater tanks. As may be seen in FIG. 1, the module 100 (which has a gray background) essentially comprises a vacuum wastewater tank 2, a water tank 5, and various supply and drain lines 111, 112, 113, 115, and further components 116. The parts of the module are situated in the pressurized area 102 of the fuselage for this purpose, which is separated from the outside area 101 by the hull 103. Ambient conditions exist in the outside area 101.

The water tank 5 of the module 100 is connected via line 111 to a water system 106. Furthermore, the water tank 5 is alternately connectable to a water service unit via supply line 112 to fill the tank 5. The wastewater tank 2 is connected via line 113 to the vacuum system 108 and may be connected via line 114 to a wastewater service unit for draining the tank 2. Furthermore, the wastewater tank 2 may be ventilated to the outside via line 115 and vacuum generator (blower) 116. The cabin area 105 is connected via line 110 to the outside air 101. The power supply of the consumers 107 occurs via power which is provided by the aircraft generators via line 109.

Figure 2:
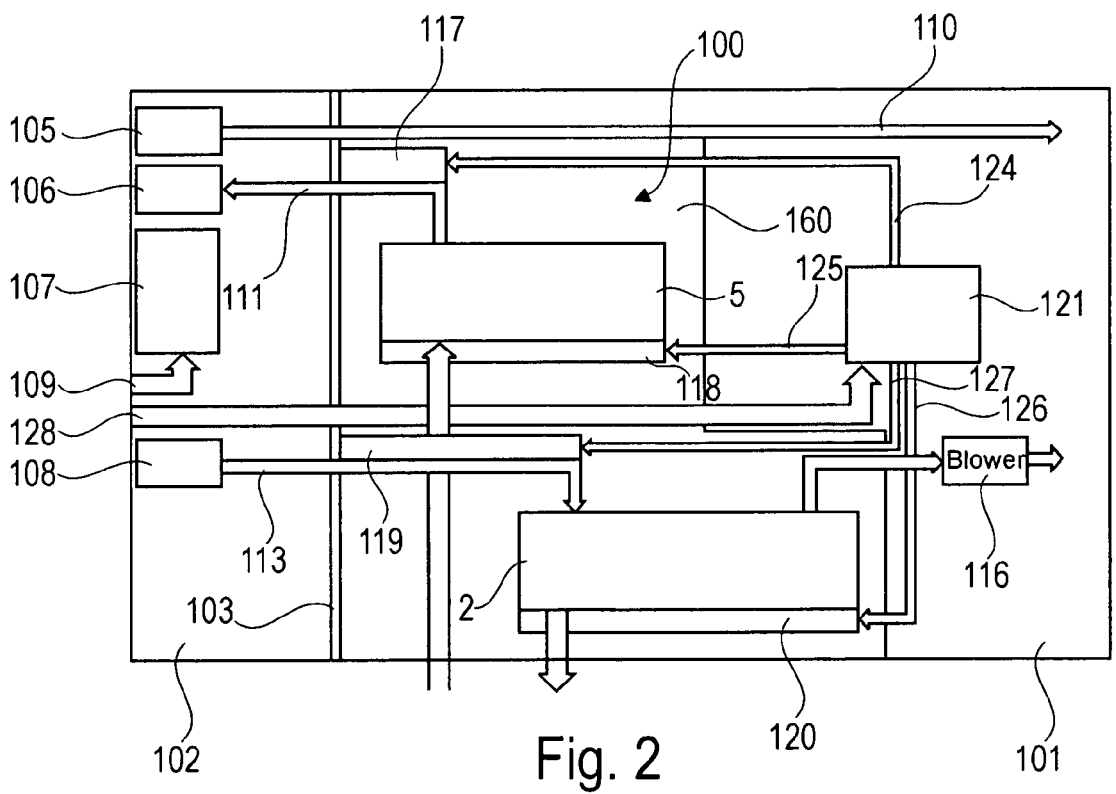
FIG. 2 shows a schematic representation of a module in the unpressurized area of the fuselage according to another exemplary embodiment of the present invention.

FIG. 2 shows a schematic representation of a water-wastewater module 100 in the unpressurized area 101 of the fuselage, which is equipped with standard water and wastewater tanks. The module 100, which is colored dark (as is also the case in FIGS. 1, 3, and 4), essentially comprises, in addition to the water tank 5, the wastewater tank 2, the connection to the water system 106, the connection to the vacuum system 108, and the lines, electric heating units 117, 118, 119, which are connected to a thermal management system 121. The connection between the electric heaters 117, 118, 119 and the thermal management system 121 is produced via connections 124, 125, 126, and 127. The electric heater 117 is provided here for heating the line 111, which leads from the water tank 5 to the water system. 106 situated in the pressurized area 102. The electrical heater 118 is provided for heating the water tank 5. The electrical heater 119 is used for heating line 113, which leads from the vacuum system 108 to the wastewater tank 2. Furthermore, an electrical heating element 120 is provided for heating the wastewater tank 2.

This module fulfill the requirements of modular construction for water supply and wastewater disposal in the pressurized area and in the unpressurized area of an aircraft and also the requirements for heating tanks in proximity to the structure.

To shorten installation time during the equipment mounting, to save space for systems in the cabin area (particularly in the cargo space), and for better accessibility in case of maintenance, the typical system made of aircraft fuselage, wastewater collection tank, and water supply is combined according to the present invention in an integrated component, which may preferably be inserted from below or laterally or from any arbitrary other direction into the fuselage in the form of a self-supporting module 100. For example, depending on the installation location, this module may be inserted into the pressurized area of the fuselage and seal it after completed mounting. When installed in the unpressurized area of the fuselage, the module may assume insulation and heating functions for the water and wastewater components.

According to one aspect of the present invention, the wastewater collection tanks are integrated similarly to the fuel tank of an aircraft into the structure of the module 100. The drainage device is also an integral component of this module, as well as the vacuum generators, fill level sensors, freshwater tanks, and/or a water generation system and the heater, so that during the mounting of the module, only the electrical connections, the water connections, and the connections to the vacuum delivery lines and, for installation in the unpressurized area, a connection to the cabin air, must be produced.

The module and the fuselage may advantageously be manufactured separately from one another and first have to be combined during the final mounting of the aircraft. Additional weight due to structural reinforcements and the fuselage cutout for the module are largely compensated for by dispensing with fasteners for the wastewater collection tank and the structural reinforcements provided for this purpose.

It is to be noted that the exemplary embodiments shown in the figures may be combined with one another arbitrarily.

The possibility of integrating the water-wastewater module according to the present invention into the unpressurized area of an aircraft fuselage requires fulfilling various specific requirements, so that overall a complex total system results. Additional room is essentially provided through the displacement into the cabin area, which may be made available for passengers or freight.

Figure 3:
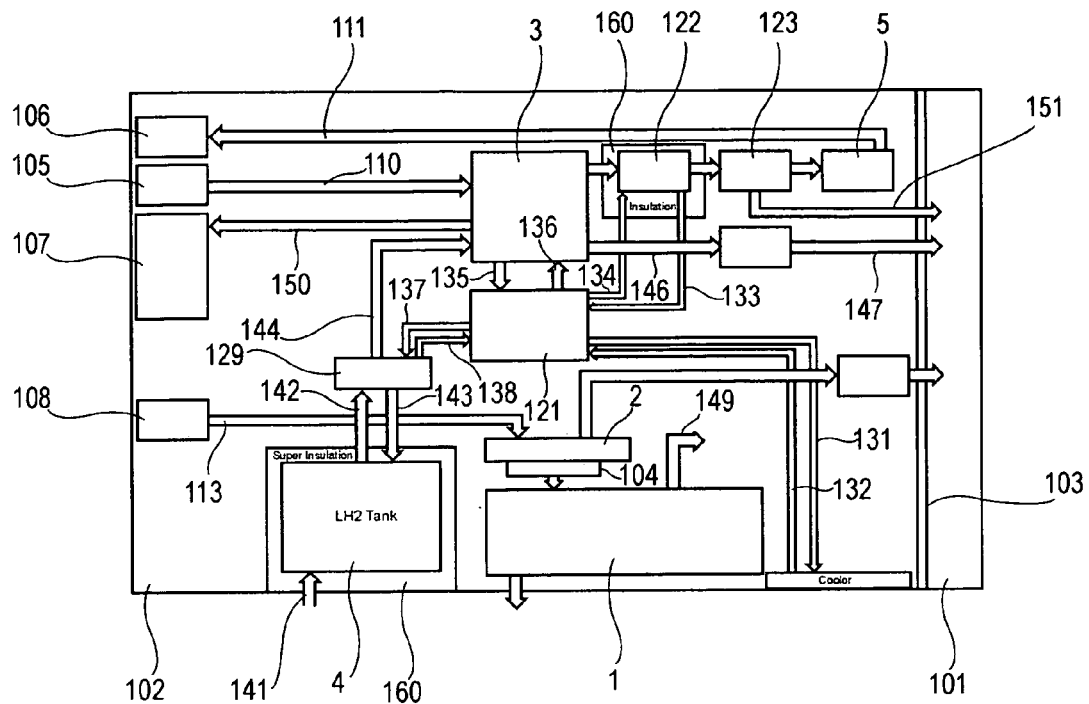
FIG. 3 shows a schematic representation of a module in the pressurized area of the fuselage according to a further exemplary embodiment of the present invention.

FIG. 3 shows a schematic representation of a water-wastewater module 100 (colored dark), which is situated in the pressurized area of the fuselage and has a water generation unit 3 and structure-integrated wastewater tanks 1, 2. The essential components of the module 100 are formed by the first wastewater tank 1, the second wastewater tank 2, the water generation unit 3, and the hydrogen accumulator 4. The tank 2 is a vacuum wastewater tank which is connected via line 113 and the vacuum system 108. The tank 1 is a wastewater storage tank whose shape is tailored to the fuselage contour and which may be ventilated via line 149. A pump 104 is connected between the two tanks 1, 2 in order to pump wastewater from the vacuum tank 2 into the storage tank 1.

The water generation is performed via a fuel-cell module, which comprises a fuel cell 3. The module is connected via the line 110 to the cabin air 105. Furthermore, the fuel-cell system 3 is connected via a line 150 to the power consumers (such as the toilets, the galley, or diverse pumps or the like) 107. The water produced in the fuel cell 3 may be condensed and separated via condenser 122 and water separator 123. It is then supplied to the freshwater buffer tank 5, which is connected via line 111 to the water system 106. Gases or the like isolated from the water in the water separator may be released to the outside via line 151.

The hydrogen tank 4, which may be a metal hydride accumulator, a pressurized tank, or a cooling tank, for example, may be connected via line 141 to a filling station. Furthermore, lines 142, 143 are provided, which connect the tank to a hydrogen evaporator 129. The gaseous hydrogen may then be supplied via line 144 to the fuel-cell system 3. Furthermore, a thermal management system 121 is provided, which is connected via lines 131, 132 to a cooling system 130. Moreover, lines 137, 138 are provided, which connect the thermal management system 121 to the hydrogen evaporator 129, in order to supply heat energy to the hydrogen evaporator, for example. Furthermore, lines 133 and 134 are provided to supply heat to the condenser 122 or to dissipate heat therefrom. Moreover, heat lines 135, 136 are provided, which connect the thermal management system 121 to the fuel-cell module 3 in order to dissipate the heat produced by the fuel-cell module or also to supply heat to the module.

Both the hydrogen accumulator 4 and also the condenser 122 are shielded to the environment using thermal insulation 160.

Figure 4:
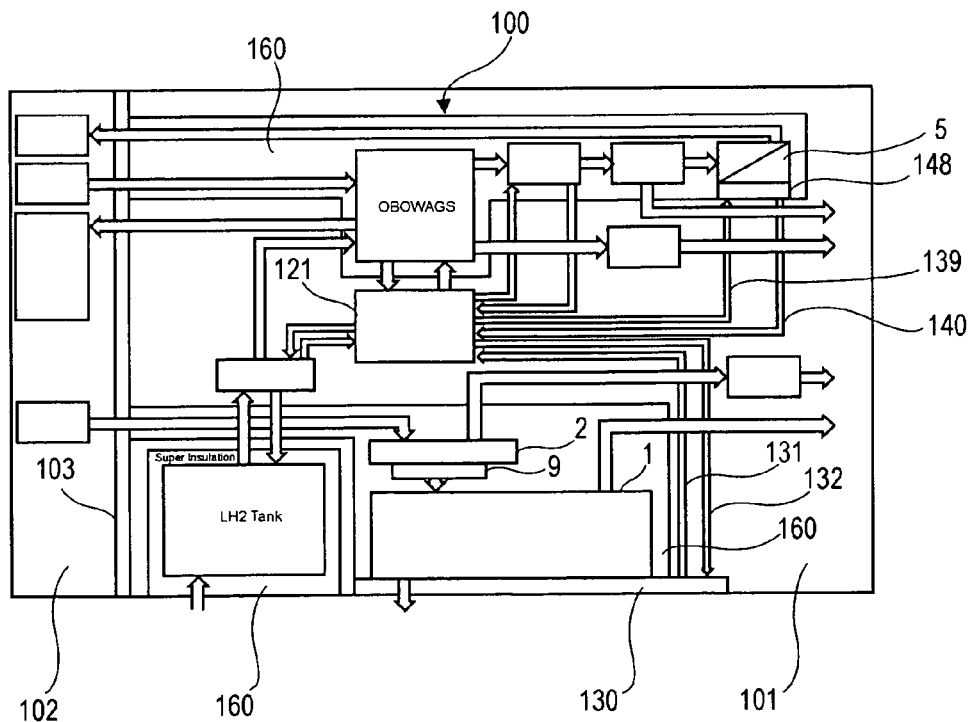
FIG. 4 shows a schematic representation of a module in the unpressurized area of the fuselage according to a further exemplary embodiment of the present invention.

FIG. 4 shows a water-wastewater module 100 according to the present invention, situated in the unpressurized area of the fuselage, equipped with water generation and structure-integrated wastewater tanks. In particular, heating elements 148, 130 are provided in this exemplary embodiment, which are connected via corresponding supply or drain lines 131, 132 and 139, 140 to the thermal management system 121. The heating element 148 is used to heat the freshwater buffer tank 5, which is situated in the unpressurized area 101 of the fuselage. Furthermore, the heating/cooling element 130 is used for heating and/or cooling the wastewater storage tank 1.

A vacuum valve 9 is provided between the wastewater storage tank 1 and the vacuum wastewater tank 2.

The freshwater system 3, 122, 123, 5 is used for generating fresh water from fuel cells 3. The freshwater system 3, 122, 123, 5 is added to the module 100 as a complex component, the cooling devices and connections required for a component of this type being integral parts of the module. For example, these are the lines 135, 136, 134, 133 and 139, 140.

If the module 100 is used in the unpressurized area, the waste heat of the fuel cells 3 is used for the purpose of heating all water-guiding components in such a way that freezing under the temperature conditions existing at great height of approximately −55° C. or under polar frost conditions with windchill (of approximately −70° C.) may be prevented. For this purpose, the cooler of the fuel-cell system 3 is supplied with heated coolant liquid via a valve system in such a way that the quantities of water contained in the wastewater tank 1 and in the freshwater buffer tank 5 significantly exceed the freezing point (0° C.) at all times. Valves and pipelines which are also threatened by freezing under the conditions described are electrically heated by the fuel-cell system 3.

Since the fuel-cell system must be supplied with hydrogen in addition to air oxygen, which is taken from the cabin air in the present case, the necessity exists of either reforming this hydrogen from hydrocarbons or carrying it in liquid or gaseous state (see hydrogen tank 4).

If liquid hydrogen is used, it is first vaporized and heated to a temperature tailored to the fuel cells (approximately 10 to 50° C.). The waste heat of the fuel cells is also used for this vaporization and heating procedure.

Before reaching the operating temperature of the fuel-cell system (starting procedure of the system) the liquid hydrogen is vaporized and preheated using electrical energy from the on-board electrical system of the aircraft (batteries, ground supply, power plant generators, or APU as power providers).

The storage tank for hydrogen 4 is either an integral component of the module 100 or is located at another location of the aircraft having a supply line to the module. Since evaporation of hydrogen occurs during long storage time of liquid hydrogen, the hydrogen is conducted into the outside at the aircraft top upon exceeding a specific container internal pressure (not shown in the figures).

Notwithstanding typical vacuum wastewater systems which only operate using one pressurized container, which provides the transport energy for feces in the vacuum system via a vacuum generator or via the differential pressure between cabin area and outside, according to the present invention, two containers are used per system, the first container 2 being a smaller pressurized container which provides the transport energy with the aid of a vacuum generator or with the aid of the differential pressure between cabin area and outside of the aircraft. Furthermore, a second, larger container 1 is provided, which is tailored to the shape of the fuselage and is used as an unpressurized storage container for feces. Pressurized container 2 and storage container 1 are connected via a pipeline to pump 104 for the feces transport in a module for the pressurized area.

In a module for the unpressurized area, these two containers 1, 2 are only connected via a valve 9. This valve is activated via a pressure cylinder which uses the differential pressure between cabin and outside as positioning energy. The storage container 1 advantageously also operates as a vacuum container at travel flight level in this system. It is thus possible to implement a shape-tailored container 2 having relatively low wall thicknesses, since no pressure differences occur between container outside and inside.

Furthermore, thermal insulators 160 are provided to insulate the corresponding lines, tanks, and other units to the environment.

Figure 5:
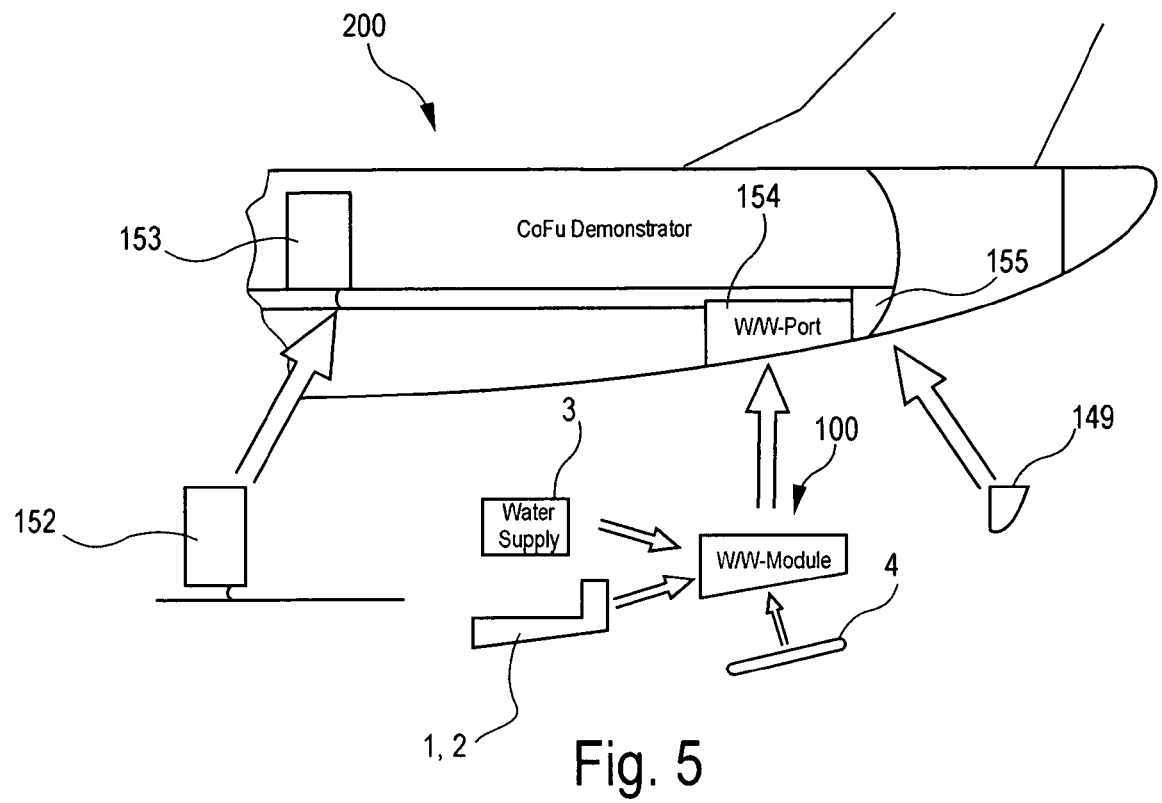
FIG. 5 shows a schematic representation of a tail area of an aircraft having an installed module according to an exemplary embodiment of the present invention.

FIG. 5 shows a schematic representation of a tail area of an aircraft having an installed module according to an exemplary embodiment of the present invention. The module 100 comprises a water provision unit, which comprises a fuel-cell module 3, for example, and a wastewater storage tank 1 and a vacuum wastewater tank 2. Water supply 3 and wastewater tanks 1, 2 and hydrogen accumulator 4 are combined integrally in the form of a water-wastewater module 100 for this purpose. The complete module is then inserted into a corresponding opening of the fuselage 200 and is tailored to the fuselage contour, as indicated by reference numeral 154. Furthermore, an air humidifier module 149 is provided, which may be attached at location 155 in the fuselage. In addition, an improved toilet and vacuum system 152, which is connected to the module via corresponding lines 156, is attached at the location 153 in the fuselage.

Figure 6:
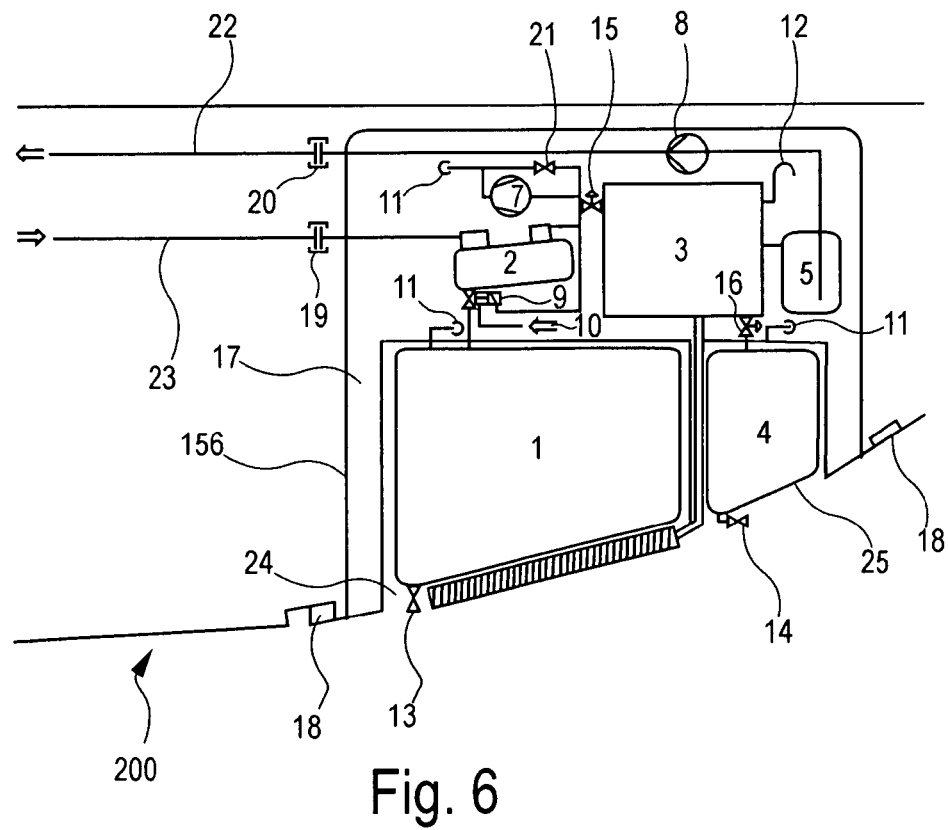
FIG. 6 shows a schematic representation of a module, installed in the tail area of an aircraft, according to an exemplary embodiment of the present invention.

FIG. 6 shows a schematic representation of an exemplary module according to the present invention, inserted into an opening in the tail of an aircraft fuselage 200 and connected to corresponding supply lines 22, 23. In particular, a heat exchanger 6 is provided, which is connected to the fuel-cell system 3. Furthermore, a vacuum generator 7 is provided, which is connected to an external ventilator 11 and a check valve 21. Check valve 21 and vacuum generator 7 are connected to the vacuum wastewater tank 2, in order to generate a vacuum therein when the external pressure is too high (for example, when the aircraft is on the ground).

Furthermore, check valve 21 and vacuum generator 7 are connected to the wastewater valve 9 having the pressure cylinder activation.

A ventilator 10 is also provided. The wastewater storage tank is also connected to a ventilator 11 to the outside. The hydrogen accumulator 4 is also connected to such a ventilator 11 to the outside.

The fuel-cell system 3 is connected to an inlet 12 for cabin air and to the water buffer tank 5. Furthermore, a water pump 8 is provided to drain water from the buffer tank 5 via connection element 20 to the water system 22. Wastewater storage tank 1 also has an insulator 24 and a wastewater emptying valve 13.

The hydrogen container 4 also has an insulator 25 (for liquid hydrogen operation) and a filling valve for hydrogen 14. Furthermore, a valve 16 is provided, which connects the fuel-cell system 3 to the hydrogen accumulator 4.

The vacuum wastewater tank 2 is connected via connection 19 to the vacuum system 23.

The entire module is integrated in the module body 17 and integrated via seals and fasteners 18 in the fuselage cutout 156.

The fuel-cell system 3 also has a ventilation 15.

It is to be noted that "comprising" does not exclude other elements or steps and "a" or "an" does not exclude multiples. Furthermore, it is to be noted that features or steps which have been described with reference to one of the above exemplary embodiments may also be used in combination with other features or steps of other exemplary embodiments described above. Reference numerals in the claims are not to be seen as a restriction.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A water-wastewater module for disposing of feces and wastewater, for providing fresh water, and for providing a vacuum to transport feces in an aircraft, the module comprising:
   a first tank;
   a second tank;
   wherein the first tank is a vacuum-proof pressure container for transporting feces or wastewater;
   wherein the second tank is an unpressurized storage container;
   wherein the second tank is situated below the first tank and is connected to the first tank to drain contents of the first tank into the second tank;
   wherein the module is self supporting;
   wherein the module has a shell section corresponding to a contour of an aircraft fuselage opening; and
   wherein the module is arranged and dimensioned for insertion into the aircraft fuselage opening such that, when the module is so inserted, the fuselage opening is substantially closed by the shell section of the module.

2. The water-wastewater module of claim 1, further comprising:
   a pipeline for connecting the first tank to the second tank; and
   an interposed pump for pumping the contents of the first tank into the second tank;
   wherein the module is situated in a pressurized area of the aircraft.

3. The water-wastewater module of claim 1, wherein the module is insertable from below or laterally into a fuselage of the aircraft.

4. The water-wastewater module of claim 1, wherein the module has a contour corresponding to the opening of the aircraft fuselage to effect sealing an interior of the aircraft fuselage from the outside, when the module is completely inserted in the aircraft fuselage.

5. A use of a water-wastewater module of claim 1 in an aircraft.

6. An aircraft comprising a water-wastewater module of claim 1.

7. The water-wastewater module of claim 1, further comprising:
   a pipeline for connecting the first tank to the second tank; and
   an interposed valve for opening the connection;
   wherein the module is situated in an unpressurized area of the aircraft.

8. The water-wastewater module of claim 7, further comprising a pressure cylinder, which is exposed to cabin pressure on a first side of the pressure cylinder to open the valve and is exposed to ambient pressure on a second side of the pressure cylinder, wherein the exposure of the first and second sides of the pressure cylinder causes the pressure cylinder to open the valve when the ambient pressure falls below the cabin pressure.

9. The water-wastewater module of claim 1, further comprising a hydrogen accumulator for storing hydrogen, wherein the hydrogen accumulator is an integral component of the module.

10. The water-wastewater module of claim 9, wherein the hydrogen accumulator is a pressure tank.

11. The water-wastewater module of claim 9, wherein the hydrogen accumulator is a metal hydride accumulator.

12. The water-wastewater module of claim 9, wherein the hydrogen accumulator is a cryotank for liquid hydrogen.

13. The water-wastewater module of claim 1, wherein the water-wastewater module has an integrated freshwater buffer tank for providing fresh water.

14. The water-wastewater module of claim 13, further comprising a fuel-cell module having at least one fuel cell for producing water, oxygen, and electrical energy, wherein the fuel-cell module is connected to the integrated freshwater buffer tank for supplying the water produced to the integrated freshwater buffer tank.

15. The water-wastewater module of claim 14, wherein the fuel-cell module is connectable to a passenger area of the aircraft in order to supply the oxygen produced to passengers.

16. The water-wastewater module of one of claim 14 or 15, wherein the fuel-cell module has a thermal connection for heating a water-guiding component of the water-wastewater module using waste heat of the fuel-cell module.

17. The water-wastewater module of claim 14, wherein the water-wastewater module has a thermal management system which relays and controls waste heat of the fuel-cell module to heat a water-guiding component of the water-wastewater module.

* * * * *